United States Patent
Shanker et al.

(10) Patent No.: US 10,212,105 B2
(45) Date of Patent: Feb. 19, 2019

(54) COLLECTIVE ADDRESS BOOK SYSTEM

(71) Applicant: The Fin Exploration Company, San Francisco, CA (US)

(72) Inventors: Sidharth Shanker, San Francisco, CA (US); Venkataramanan Iyer Nandagopal, San Francisco, CA (US); Robert Cheung, San Francisco, CA (US); Robert Cobb, San Francisco, CA (US); Daniel Cosson, San Francisco, CA (US); Andrew Kortina, San Francisco, CA (US); Samuel Lessin, San Francisco, CA (US); Michael Richter, Atherton, CA (US); Andrew Staub, Berkeley, CA (US)

(73) Assignee: The Fin Exploration Company, San Francisco, CA (US)

( * ) Notice: Subject to any disclaimer, the term of this patent is extended or adjusted under 35 U.S.C. 154(b) by 0 days.

(21) Appl. No.: 15/415,526

(22) Filed: Jan. 25, 2017

(65) Prior Publication Data
US 2018/0212922 A1   Jul. 26, 2018

(51) Int. Cl.
*H04L 12/58* (2006.01)
*H04L 29/12* (2006.01)

(52) U.S. Cl.
CPC .............. *H04L 51/04* (2013.01); *H04L 51/32* (2013.01); *H04L 61/1594* (2013.01)

(58) Field of Classification Search
CPC . H04L 61/1576; H04L 61/1564; H04L 51/04; H04L 51/32
See application file for complete search history.

(56) References Cited

U.S. PATENT DOCUMENTS

| | | |
|---|---|---|
| 5,862,223 A | 1/1999 | Walker et al. |
| 7,512,612 B1 | 3/2009 | Akella |
| 7,591,542 B2 | 4/2009 | Waingold |
| 8,484,186 B1 | 7/2013 | Kapczynski et al. |
| 9,049,249 B2 | 6/2015 | Zhang et al. |

(Continued)

FOREIGN PATENT DOCUMENTS

WO   WO 01/53970   7/2001

OTHER PUBLICATIONS

LinkedIn, "Requesting an Introduction," LinkedIn Help, [online], URL: <https://www.linkedin.com/help/linkedin/answer/1959/requesting-an-introduction?lang=en>, Feb. 2016 (approx.), retrieved from the internet Jan. 10, 2017, 2 pages.

(Continued)

*Primary Examiner* — June Y Sison
(74) *Attorney, Agent, or Firm* — Fish & Richardson P.C.

(57) ABSTRACT

Methods, systems, and apparatus, including computer programs encoded on computer storage media, for a collective address book system. One of the methods includes: receiving a request from a user to contact a person of interest; determining that contact information for the person of interest is not available in the user's contact information to which the system has access; determining that the collective address book system has access to contact information for the person of interest; generating proxy contact data for the person of interest; and providing the proxy contact data to the first user.

24 Claims, 5 Drawing Sheets

(56) References Cited

U.S. PATENT DOCUMENTS

| | | |
|---|---|---|
| 9,495,350 B2 | 11/2016 | John |
| 9,628,582 B2 | 4/2017 | Hu |
| 9,703,837 B1 | 7/2017 | Teng |
| 10,051,546 B2 | 8/2018 | Kato |
| 2002/0059201 A1* | 5/2002 | Work .................... G06Q 10/10 |
| 2004/0047615 A1 | 3/2004 | Itoh |
| 2005/0132060 A1* | 6/2005 | Mo ......................... H04L 51/12 |
| | | 709/227 |
| 2006/0047615 A1 | 3/2006 | Ravin et al. |
| 2006/0136419 A1* | 6/2006 | Brydon ............... G06Q 10/107 |
| 2008/0134292 A1* | 6/2008 | Ariel .................... G06Q 10/109 |
| | | 726/3 |
| 2009/0157708 A1 | 6/2009 | Bandini et al. |
| 2011/0206196 A1* | 8/2011 | Isaacson ................ G06Q 10/10 |
| | | 379/142.06 |
| 2012/0095977 A1 | 4/2012 | Levin et al. |
| 2013/0091209 A1* | 4/2013 | Bennett .................. G06Q 50/01 |
| | | 709/204 |
| 2014/0032659 A1* | 1/2014 | Marini .................... H04L 51/32 |
| | | 709/204 |
| 2014/0237037 A1 | 8/2014 | Waingold |
| 2014/0370865 A1 | 12/2014 | Wilhelm |
| 2015/0373092 A1 | 12/2015 | Ranganath et al. |
| 2016/0165054 A1 | 6/2016 | Cudak et al. |
| 2016/0179938 A1* | 6/2016 | Ghafourifar ........ G06F 21/6227 |
| | | 707/609 |
| 2016/0191461 A1 | 6/2016 | Wang |
| 2018/0212910 A1 | 7/2018 | De Villers et al. |

OTHER PUBLICATIONS

Ford Saeks, "How to Leverage the Power of LinkedIn and Facebook Groups," LinkedIn Pulse, [online], URL: <https://www.linkedin.com/pulse/how-leverage-power-linkedin-facebook-groups-ford-saeks>, Sep. 9, 2016, retrieved from the internet Jan. 10, 2017, 4 pages.

International Search Report and Written Opinion of the International Searching Authority, PCT Application Serial No. PCT/US2018/014909, dated Jun. 15, 2018, 15 pp.

International Search Report and Written Opinion of the International Searching Authority, PCT Application Serial No. PCT/US2018/014823, dated Jun. 22, 2018, 13 pp.

* cited by examiner

COLLECTIVE ADDRESS BOOK SYSTEM

BACKGROUND

Technical Field

This specification relates generally to digital data processing, and more particularly, but not by way of limitation, to a collective address book system.

Background

The extensive connectivity enabled by the internet creates enormous networking opportunities. Social Networking platforms exist that facilitate networking for a variety of purposes including job opportunities, professional development, social events and around areas of common interest. However, a need exists for a better way to identify, contact, and communicate with a person of interest. More specifically, a need exists for a way for an individual to contact a person of interest directly regardless of whether the individual has the person of interest's contact information.

SUMMARY

In general, one innovative aspect of the subject matter described in this specification can be embodied in methods that include the actions of: receiving a request from a user to contact a person of interest; determining that contact information for the person of interest is not available in the user's contact information to which the system has access; determining that the collective address book system has access to contact information for the person of interest; generating proxy contact data for the person of interest; and providing the proxy contact data to the first user.

The method can further include: receiving, at the system, an indication that the user is sending a message to the person of interest using the proxy contact data; automatically delaying, at the system and with the permission of the user, sending of the message; and determining whether the message meets a quality metric. The method can further include stopping the message from being sent to the person of interest when the message does not meet the quality metric. The message can be an email message or a text message.

Automatically delaying sending of the message can be a delay in sending the message of less than five minutes. The proxy contact data can include a proxy telephone number. The proxy telephone number can be reused for parties other than the first user and the second user. Determining that the contact information for the person of interest is not available in the user's contact information to which the system has access can further include determining that the information for the person of interest is not available in public databases to which the system has access. In one embodiment, the proxy contact data can not be used to contact the person of interest outside of the collective address book system.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination.

The subject matter described in this specification can be implemented in particular embodiments so as to realize one or more of the following advantages. Embodiments enable users to contact (e.g., email, text, call) other people (including non-users) even if the user does not have the person of interest's contact information (i.e., phone number or email address). Embodiments enable a user to contact a person of interest without sharing the person of interest's contact information with the user. Further, embodiments can identify the best method to contact someone for a given purpose at a given time and can predict response times. On the recipient's side, embodiments can optimize delivery of asynchronous communication for efficiency and engagement.

Embodiments prevent users from sending spam or otherwise violating a platform's use policy. Embodiments help users find the best way to reach someone and help users ask for information about, or obtain an introduction to, someone they do not know personally. Stated differently, embodiments of the invention enable a user to ask relevant people in a network about a person of interest or another topic, or ask relevant people in a network for an introduction to a person of interest, in a manner that is acceptable to the people being queried. Another advantage is that because embodiments described in this specification are based off of data that individuals use (actual address books, actual emails, etc.) the collective address book is more accurate.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The present invention is directed to a collective address book system. In one embodiment, a system creates and maintains universal address book using email, social network, address book, and calendar data from multiple users along with other information (e.g., voice and text data) that users provide. The collective address book system uses that information to build out its database of contact information. In one embodiment, when a user wants to contact someone listed in the system for which the user does not otherwise have contact information, the system generates proxy contact data, e.g., a proxy email address or phone number, and provides the proxy contact data to the requesting user.

Figure 1:
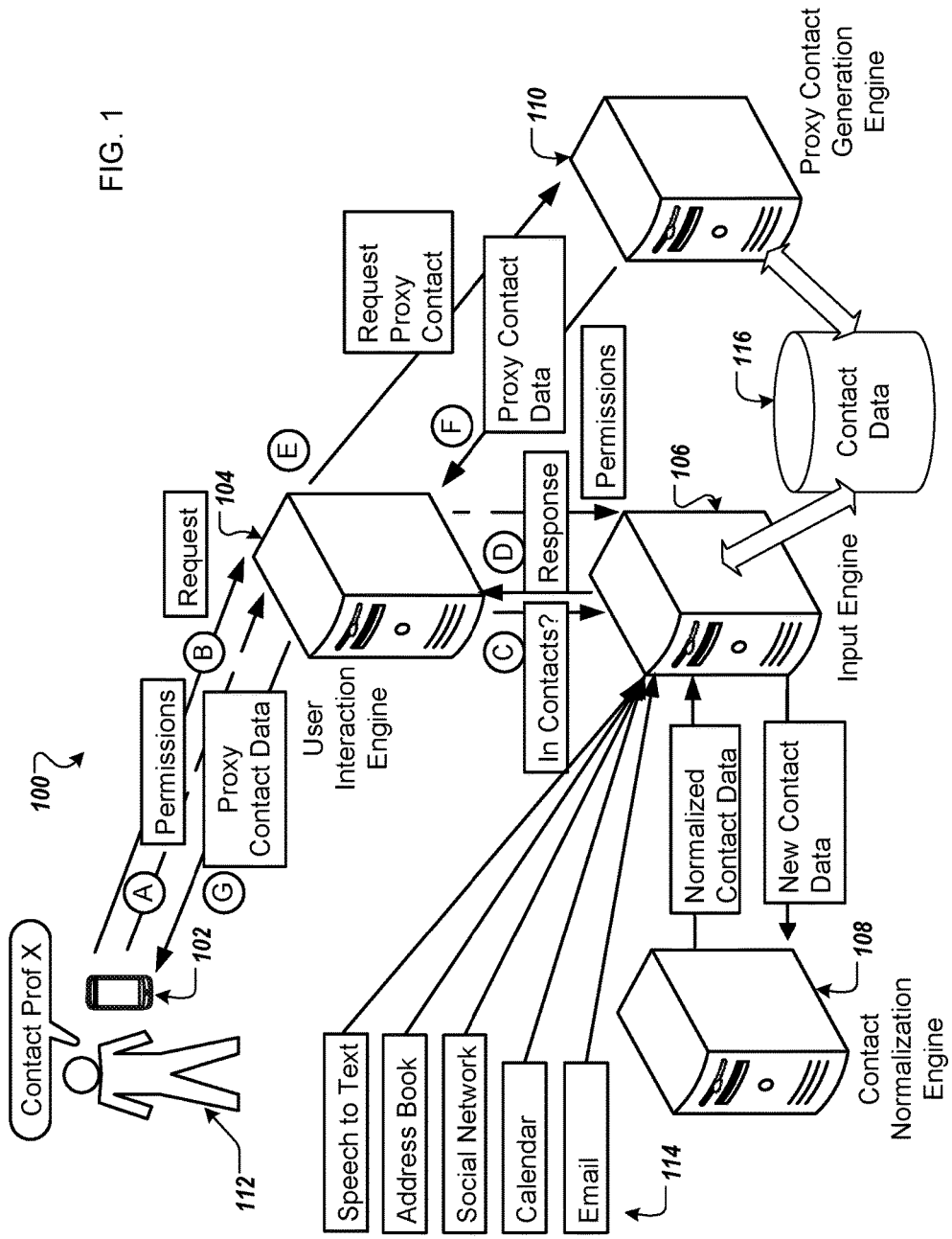
FIG. 1 is a diagram of an exemplary collective address book system for facilitating contact between a user and a person of interest.

FIG. 1 is diagram of an exemplary collective address book system 100 for facilitating contact between a user 112 and a person of interest. In the illustrated example, the system 100 includes a user interaction engine 104, an input engine 106, a contact normalization engine 108 and a proxy contact generation engine 110. In operation A, a user grants the system permission, e.g., via the user's computing device such as a mobile phone, to access one or more data sources 114. Granting permission can include the user 112 providing passwords necessary to access the user's account(s) to the system 100. The data sources 114 can include one or more of the following: an address book, a social network, a calendar and/or an email account associated with the user. Another data source that can include contact information is a database associated with interactions, e.g., via text or speech to text, that a user has with a virtual personal assistant. The permission information can be further communicated to the input engine 106.

In operation B, the user interaction engine 104 receives a request (e.g., "Contact Professor X") from user 112. In one embodiment, a mobile computing device 102 detects the user's request and transmits it to the user interaction engine. The mobile computing device or the user interaction engine 104 can transcribe the request and send it to a query processing engine (not shown) or the request can be recorded and forwarded to a human-staffed backend where it is converted into a normalized contact request.

Embodiments of the system can receive explicit requests (e.g., a user can press a button entitled "Contact this person") and more indirect requests (e.g., a user can enter a voice request stating "Call Professor X" or text "Find me Joe Q. Public at Company Y". Depending on the mode of the request, embodiments can process the request in different ways: For example, a voice request goes through a voice to text transcription engine. Text can be put through an entity and intent identification engine, and based on the confidence of these automated methods in the result (entities, intents), the system can invoke human review before taking action. In other words, depending on the request, some actions can be taken automatically, and others may need human intervention.

In operation C, in response to receiving a request from mobile computing device 102 the user interaction engine 104 sends a request to the input engine 106 to determine whether contact information for the person of interest is in the user's contact data, which is comprised of information the system obtained from the address book, social network, calendar and/or email account, associated with the user or, if not in the user's contact data, whether it is in the collective contact data comprised of the contact data associated with other users of the system, e.g., all other users of the system that agree to participate in a collective address book approach described in this specification. As noted above, the input engine 106 can obtain permission from the user 112 to access one or more data sources, e.g., address book, social network, calendar and/or email account, associated with the user. The permissions granted in operation A can be granted prior to, or concurrent with, the request made in operation B.

At any point in time after permission is granted by the user but preferably prior to receipt of the request noted above, the input engine 106 obtains contact data from data sources 114 and, in one embodiment, provides the new contact data to the contact normalization engine 108. Embodiments interface with the application programing interfaces provided by data sources like Google, iOS, and regularly run update jobs to fetch any newly updated information. Embodiments may also refresh a user's information when the user is active or when the user is being contacted. Embodiments primarily perform contact normalization through automated scripts, but such scripts can flag for human review in certain challenging situations. When new contact data is received, embodiments incorporate the contact data by deduping against existing contact data.

The contact normalization engine 108 returns normalized contact data to the input engine 106 and the input engine stores the normalized contact data in collective contact data 116 with an indication of who has access to the contact data. Upon receiving a request, the input engine 106 determines whether contact data for the person of interest is in the first user's contact data to which the input engine has access or, if not in the user's contact data, whether it is in the collective contact data generally and provides a response, in operation D, to the user interaction engine 104. In one embodiment, the input engine 106 also determines whether the contact information for the person of interest is in public databases accessible to the input engine as part of providing a response to the user interaction engine.

If the response in operation D includes contact data for the person of interest that resided in the user's contact data, the user interaction engine provides that contact data to the user's mobile computing device 102. However, if the response in operation D indicates that the contact data for the person of interest is not available to the user but is in the collective contact data 116, e.g., the contact data for the person of interest is not in the requesting user's contact data and such data is not in public databases accessible to the input engine, then in operation E the user interaction engine 104 requests proxy contact data from the proxy contact generation engine 110 for the person of interest. The proxy contact generation engine 110 extracts contact data for the person of interest from the collective contact data 116 and generates proxy contact data. Proxy contact data is contact data that directs a communication sent using the data to the system for further routing to the person of interest using that person of interest's true contact data.

If the user expressed a desire to contact the person of interest by email or if the user does not express a preferred mode of communication and the system determines that the best way to contact the person of interest is by email, then the proxy contact generation engine 110 generates appropriate proxy email data, e.g., ProfXsilverfish@InsertEmailService.com. If the user expresses a desire to contact the person of interest by phone or text or if the user does not express a preferred mode of communication and the system determines that the best way to contact the person of interest is by phone or text, then the proxy contact generation engine 110 generates a proxy phone number. The proxy phone number is different from the person of interest's actual phone number.

In one embodiment, the invention reuses the proxy phone number for other sender/recipient pairs. In other words, the proxy phone numbers are generated pairwise between the user and recipient so if user A wants to contact user B, a number will be generated, and if user C wants to contact D, the number could be re-used.

When the user invokes the proxy contact data, embodiments of a method include reviewing the communication, and then if the communication exceeds a quality metric, the method routes the communication to the person of interest, and the meta-data for the communication makes it clear that the communication came from the user. Communication from the person of interest in response to the user's communication is routed back to the user. Embodiments of the system may be copied on the person of interest's responsive communication and the system can participate in the communication or otherwise to help when appropriate.

In operation F, the proxy contact generation engine 110 forwards the proxy contact data back to the user interaction engine 104 which in turn forwards the proxy contact data to the user's mobile computing device 102.

In another embodiment, as opposed to the user 112 expressing a desire to contact a person of interest using a speech interface, the user 112 can browse the collective address book system contacts database through a graphical user interface. If the user already has the person of interest's contact information (e.g., in the user address book, calendar, email or social network) or if the person of interest's contact information is in a public database available to the collective address book system, then the user accesses the information directly. Otherwise, the user sees proxy contact data when looking up the person of interest.

For example, if a user A, wants to send a text message to a recipient, Professor X, and user A does not have Professor X's phone number, user A can search for Professor X and click on a link that enables User A to send a text message to Professor X. When user A clicks on the link, the collective address book system according to the invention generates a proxy phone number for Professor X that is different from Professor X's actual phone number. User A can use that proxy number whenever he wants to message or call Professor X. As noted above, in one embodiment the proxy number is not transferrable, i.e., no one else can use that number to message Professor X. In other words, the collective address book system reuses proxy numbers for other sender/recipient pairs; if another user, user B, wishes to send a message to another recipient, Professor Y, the collective address book system can reuse the same proxy number it used for the user A/Professor X pair. Whenever the collective address book system detects that user A is using the proxy number, the system routes the message to Professor X. Whenever the system detects that user B is using the proxy number, the message is routed to Professor Y. In yet another embodiment, proxy numbers are transferable.

Figure 2:
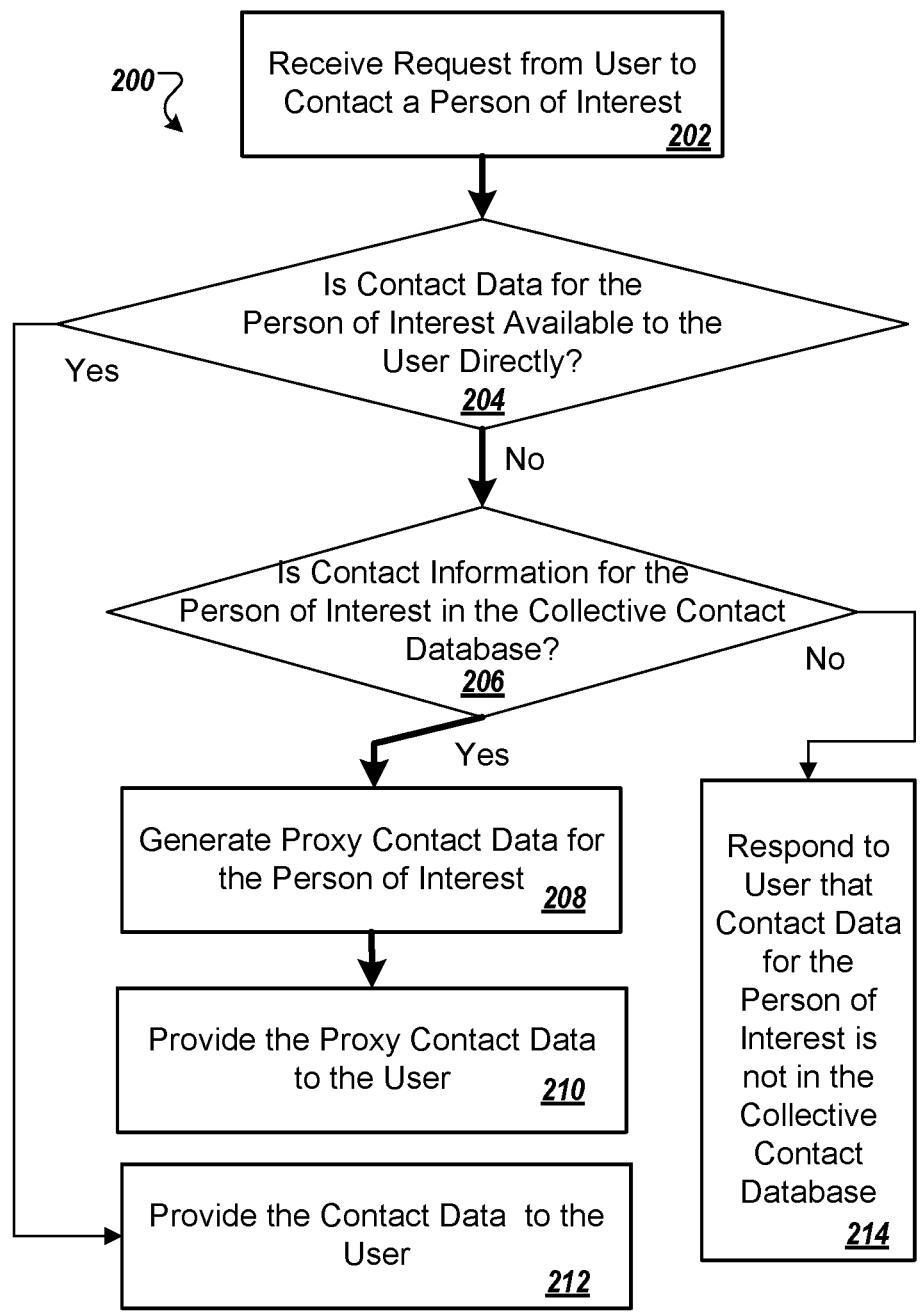
FIG. 2 is a flowchart for an exemplary method of generating proxy contact data.

FIG. 2 is a flowchart of an example method 200 executed by a collective address book system according to the invention. For convenience, the method 200 will be described as being performed by a system of one or more computers, located in one or more locations, and programmed appropriately in accordance with this specification. For example, a collective address book system, e.g., the collective address book system 100 of FIG. 1, appropriately programmed, can perform the process 200. One can develop embodiments described in this specification using a server-side web application framework such as Rails and can use Javascript and Swift along with other web standards for developing various aspects, e.g., the user interface The method includes receiving 202 a request from a user to contact a person of interest and determining 204 if the contact information for the person of interest is available to the user directly. For example, as noted above, one embodiment of the method includes determining if the contact data for the person of interest is in the user's contact data to which the collective address book system has access or if the person of interest's contact information is in a public database to which the collective address book system has access.

If the contact information for the person of interest is not available to the user directly, the method includes determining 206 whether contact information for the person of interest is in the collective contact data. If it is, the method includes generating 208 proxy contact data for the person of interest and providing 210 the proxy contact data to the user. If the contact information for the person of interest is not in the collective contact data, the method includes responding 214 to the user accordingly. If the contact information for the person of interest is available to the user directly, the method includes 212 providing the contact data to the user or using the contact data for a task.

Figure 3:
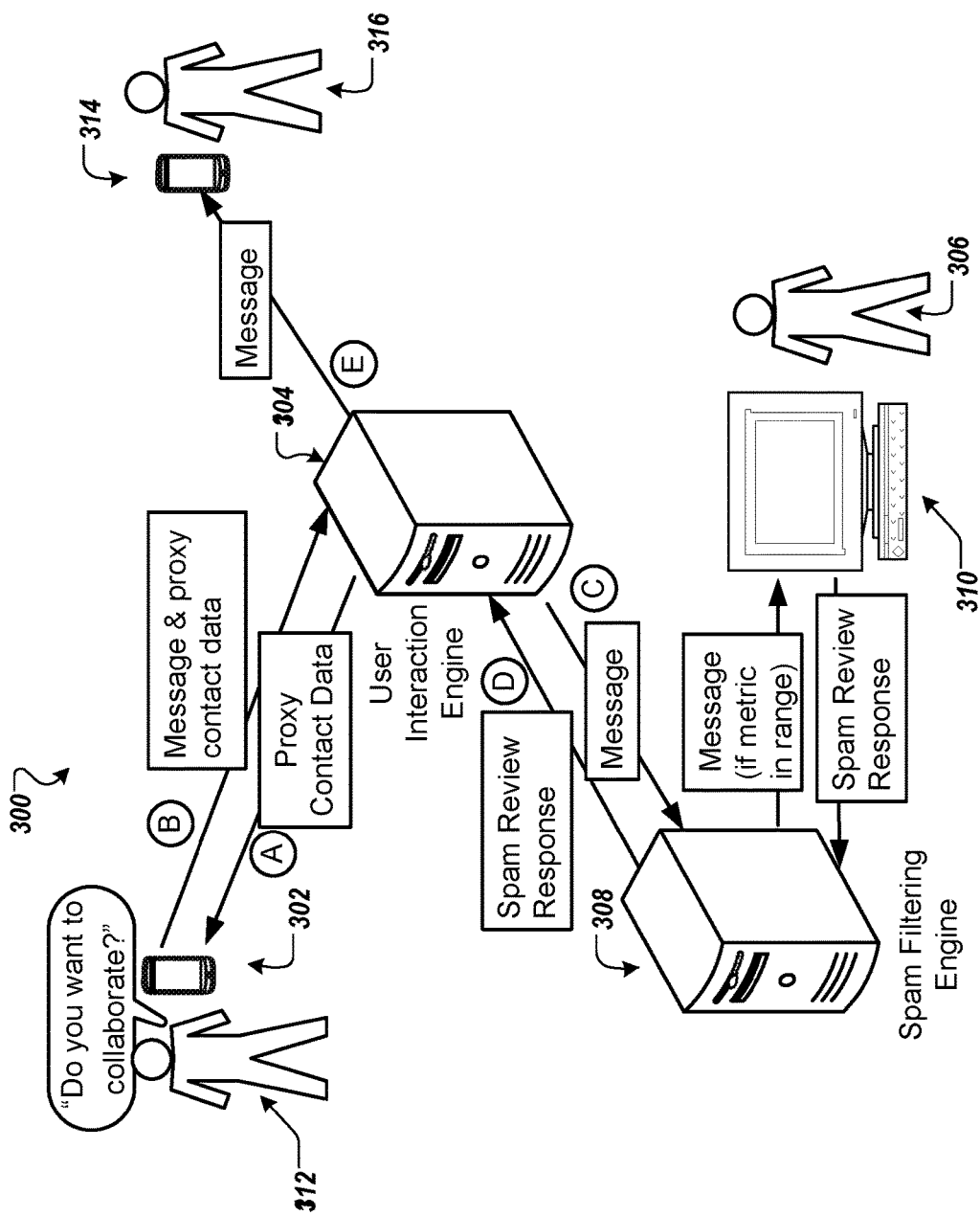
FIG. 3 is a diagram of an exemplary collective address book system that maintains the quality of the messages sent using proxy contact data.

FIG. 3 is a diagram of an exemplary collective address book system that maintains the quality of the messages sent using proxy contact data. The collective address book system 300 includes a user interaction engine 304 and a spam filtering engine 308 and can further include the other elements shown in FIG. 1. In one embodiment, in operation A the user interaction engine 304 provides the user's mobile computing device 302 with proxy contact data for a person of interest who has previously been identified, for example, as described with reference to FIG. 1. Alternatively, the user 312 can identify the person of interest at the same time that the user dictates, types or otherwise communicates her message to be sent to the person of interest.

In operation B, the computing device 302 forwards message and proxy contact data to the user interaction engine 304. In an alternative embodiment, the contact proxy data is maintained at the user interaction engine 304 and the mobile computing device simply forwards message data and data identifying the person of interest. In operation C, the user interaction engine forwards message data to the spam filtering engine 308. In response, in operation D the spam filtering engine 308 can automatically provide a spam review response to the user interaction engine 304.

In certain embodiments, spam review is performed by humans with computer assistance: pertinent information about both the user and the person of interest (previous successful attempts, popularity of the person of interest, spam score from a spam classifier) is provided to the reviewer in the context of the communication. Alternatively, a machine learned model can be trained on these human judgements and used to make the review process more efficient.

In one embodiment, the system creates two copies of the message data. One copy is reviewed, the other copy is set to be automatically forwarded to the person of interest at the end of a predefined time period, e.g., two minutes after the user sends the message. The spam filtering engine 308 will apply a quality metric to the message data to determine the likelihood of whether the message is spam or otherwise inappropriate and if the message has a quality metric above a specified threshold the message is approved and is automatically forwarded at the end of the predefined time period. In one embodiment, the spam filtering engine 308 can forward the system's copy of message data which has a quality metric score below the clearance threshold but within a specified range to an agent terminal 310 for review by an agent 306. The agent reviews the in-range message data and provides a spam review response via the agent terminal 310. In another embodiment, the system and/or the agent reviews the message data without making a copy.

In operation E, the user interaction engine 304 receives the spam review response and if the spam review response indicates that the message is not spam, the message is automatically forwarded to a contact device or service, e.g., an email address or service associated with the phone number, of the person of interest 316. In one embodiment, the user interaction engine does not forward the message until the spam review response is received. In another embodiment, the user interaction engine automatically forwards the message to the contact device or service of the person of interest 316 without waiting for the spam review response once the message has been waiting for transmission for a predefined period of time. In another embodiment, if the user interaction engine receives the spam review response before the predefined period has expired, the user interaction engine can forward the message to the computing device 314 of the person of interest 316 without waiting for the predefined period to expire.

Figure 4:
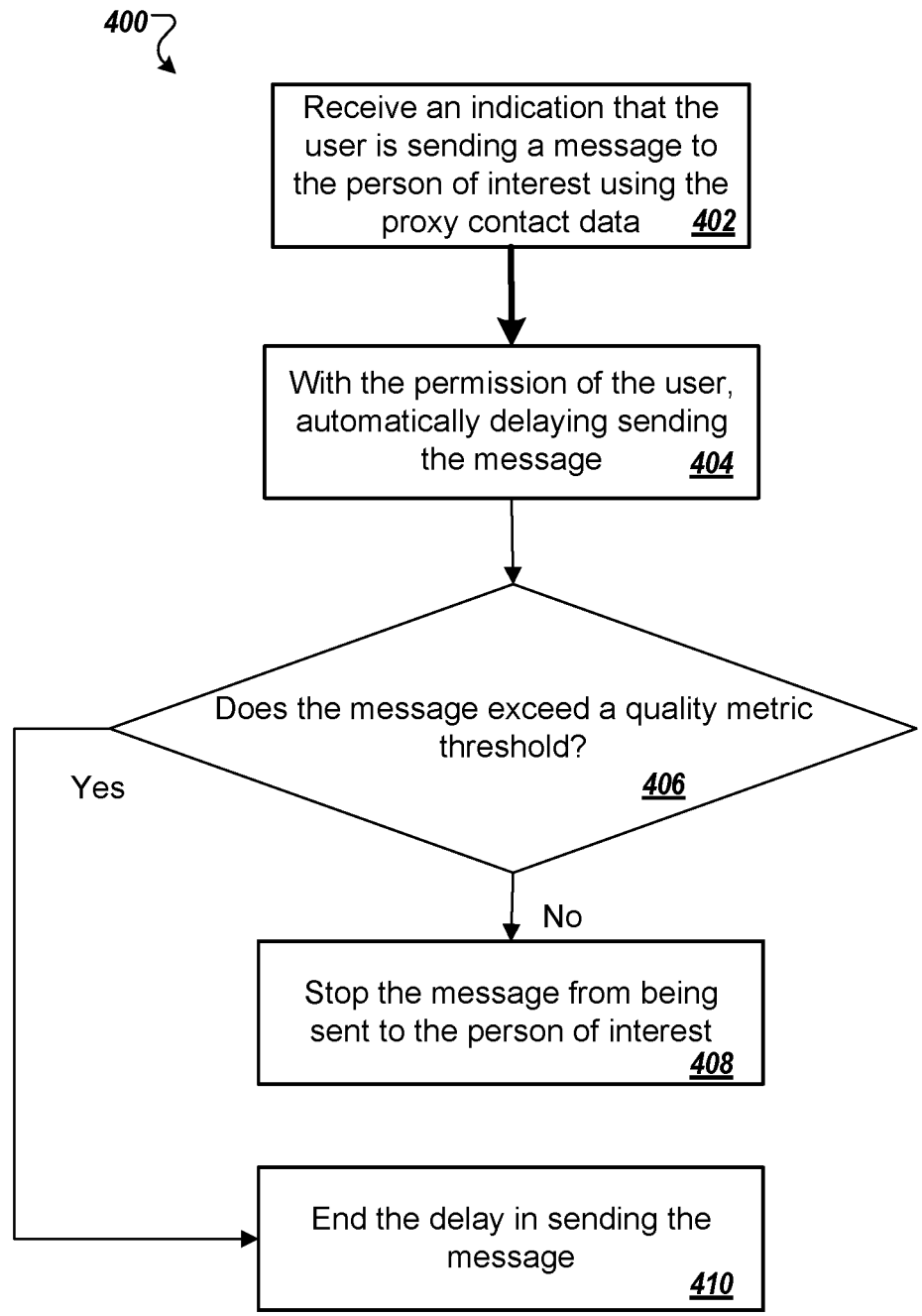
FIG. 4 is a flowchart for an exemplary method of making use of the proxy contact data generated in FIG. 2 to communicate with a person of interest.

FIG. 4 is a flowchart for an exemplary method of making use of the proxy contact data to communicate with a person of interest. The method 400 includes receiving 402 an indication that the user is sending a message to the person of interest using the proxy contact data. With the permission of the user, the method automatically delays 404 sending the message, e.g., for a specified period of time. As noted above, the method determines 406 whether the message exceeds a quality metric threshold. If the message does not exceed the threshold, the method stops 408 the message from being sent to the person of interest. If the message does exceed the threshold, the message is automatically forwarded to the person of interest, in one embodiment at the end of the predefined time period, and, in another embodiment, without any further delay. In one embodiment, the system allows a person who interacts with the system to indicate that she does not want to be contacted using proxy contact data.

Introduction or Information Request

A collective address book system can have address book, social networking, email and calendar data from multiple users along with other data, such as voice and text data, from users, e.g., obtained when users are interacting with the system. When the collective address book system is part of a virtual personal assistant system, there can be a large number of interactions between a user and the system.

In one embodiment, the system uses the data from multiple sources to develop a collective set of contact information data where the data includes information about relationships and other connections between people, including people who are non-users of the system. When a user wants to ask a question to relevant people about a person or topic of interest, or request an introduction to a person of interest by a relevant person, the user can submit such question or request to the system and the system automatically communicates with a potential referrer, or in certain embodiments with multiple or even all potential referrers, who have a relationship or connection with the person of interest without revealing to the user the identity of the potential referrer(s). Thus, instead of contacting a person of interest that a user does not know, a user can ask other people, in certain embodiments including non-users, r a question about the person of interest or for an introduction to the person of interest.

In one embodiment, the system selects people who are, or might be, connected to both parties to the request or question. If A asks to be introduced to Z, the system looks for claims relating to people who might know or be connected to both A and Z. A claim is a view or statement of fact about some aspect of the world and is associated with a source. Claims can be made by anyone or they can be inferred by a data source. For example, if B has A's contact information in her address book (a claim that B knows A), and C has a meeting in her calendar with B and Z (a claim that B has met Z), the system considers it likely that B knows both A and Z. The system does not reveal to A who might be able to introduce her or answer her question, because the referrer (in this case B) may not want A to know that she is connected to Z. In one embodiment, the system determines the strength of a connection based on connections (e.g., one-to-one emails, common calendar events with few attendees, calls or texts) that exist between two individuals. The strength of a connection can be based for example on how many connections exist and the connections can be weighted based on type and recency. Indeed, machine learning algorithms can be applied to develop a model for connection strength.

If a person, e.g., B, connected to A and Z has deemed A to be a "trusted contact", meaning that person trusts A to know who he is connected to, one embodiment of the system will disclose the name of that person to user A, but not to Z. A person may indicate that a contact is a trusted contact via a check-box or the like. However, if B, for example, chooses to respond, A will then know that B received the question or request, even if A is not a trusted contact of B.

In certain embodiments, the system determines which of the potential referrers is most likely to respond, e.g., based on the strength of the relationships (for example being in someone's address book is stronger than a calendar invite for a meeting with hundreds of people) whether the person has responded to an "ask for introduction" request before, and/or the referrer's availability at the time of selection. In one embodiment, to determine how likely B is to respond to A's request, the system can determine how well user A knows user B. The system can determine how well user A knows user B in a few ways. One approach is to determine the number of mutual connections between the two users. For example, the system can count the number of address books it has in the collective contact data that contain both user A and user B.

Another approach to determine how well A knows B is to determine the number of calendar events in which the two user co-occur. Since the system is also authorized to access certain email data for specified purposes, the system also may also be able to determine the number of email exchanges between A and B as a proxy for how well they know each other. In one embodiment the following psuedo-code is useful for determining potential referrers:

```
def get_introducer(user_a, person_z):
  potential_introducers=mutual_connections(user_a, person_z)
  potential_introducers.sort {|introducer|
  num_mutual_connections(user_a, introducer)+num_mutual_emails(user_a, introducer)+num_mutual_calendar_events(user_a, introducer)
  }
  return potential_introducers.first
```

Once the system selects one or more potential referrers, the system then sends a message, e.g., by email or text, to the selected person or people, asking the question or requesting the introduction on behalf of user A.

This same approach can be used to ask questions to people who may have expertise about or connections to any topic or entity of interest in the system. As in the prior case, this embodiment of the system determines who of the people connected to the entity are most likely to respond and sends the question to them.

Figure 5:
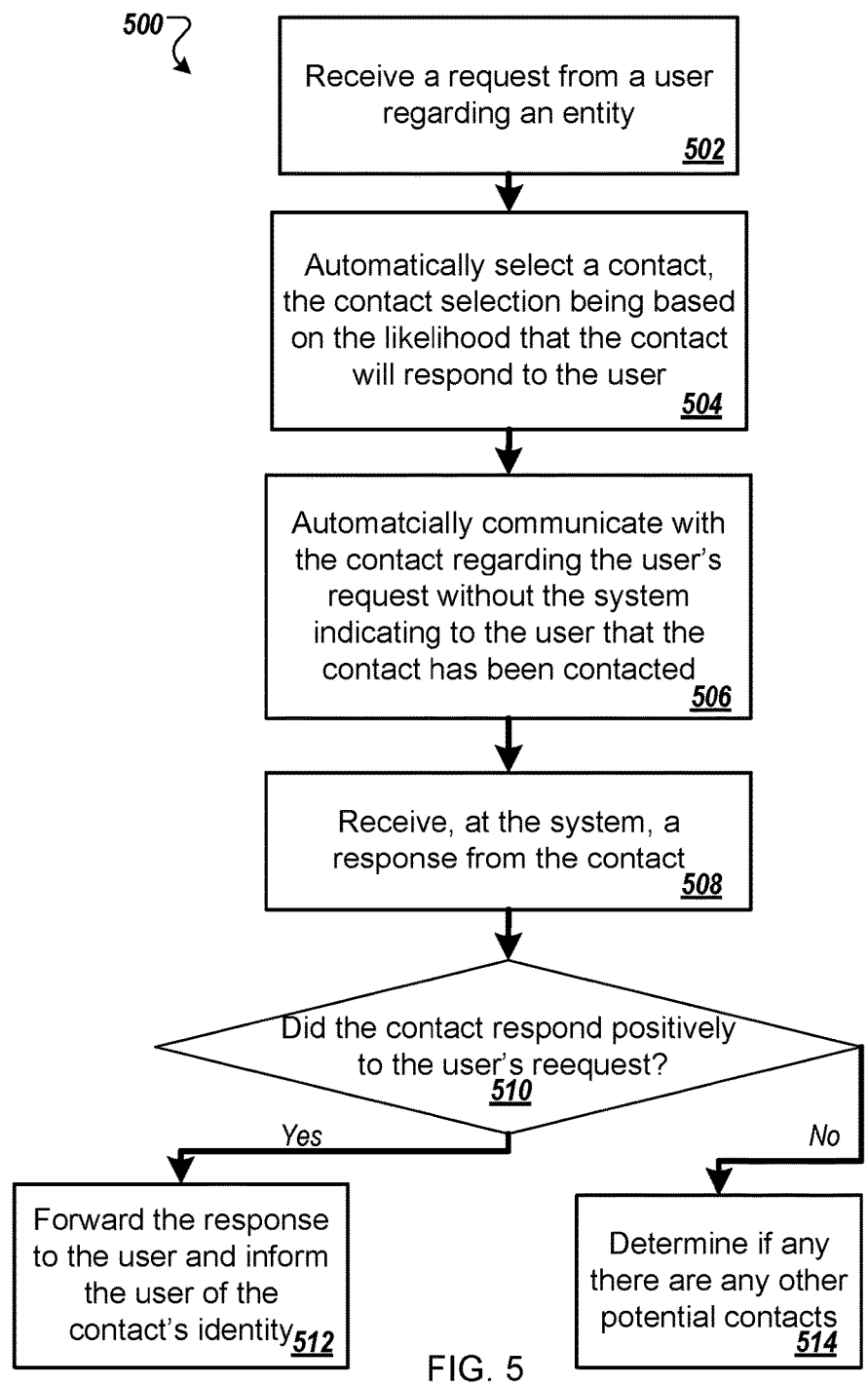
FIG. 5 is a flowchart for an exemplary method of asking for information about an entity or asking for an introduction to a person of interest.

FIG. 5 shows a flowchart according to one embodiment of a computer-implemented method in a collective address book system. The method 500 includes: receiving 502 a question or request from a user regarding a person of interest or other topic; automatically selecting 504 contacts associated with the topic, the selection of each contact being based on the strength of the connection and the likelihood that the contact will respond to the user's question or request; and automatically communicating 506 with one contact or multiple contacts regarding the user's question or request without the system indicating to the user the identity of the contacts.

The method can further include: receiving 510 a response from a contact. In another embodiment, the method can further include determining 512 if a contact responded positively to the user's request and, if so, forwarding 512 the contact's response to the user and informing the user of the contact's identity. In another embodiment, the system can automatically select one contact at a time, in order from best to worst. The system will look for the best contact based on the strength of the relationships, the likelihood that the contact will respond to the user's question or request, and/or the contact's availability at the time of selection. If the first contact does not respond at all, or does not respond positively, to the user's question or request, the method can determine 514 the next best potential contact in the system that is also associated with the topic and likely to respond to the user's question or request. The selection and ordering of the contacts being based on the strength of the relationships, the likelihood that the contact will respond to the user's question or request, and/or the contact's availability at the time of selection, and can include determining that the likelihood that the contact will respond to the user's question or request exceeds a predetermined threshold.

In one embodiment, the question or request from the user regarding a topic is a question about, or for an introduction to, a person of interest. In another embodiment, a different type of request is made, such as asking the person of interest a question on the user's behalf (regardless of whether the user is identified to the person of interest). In another embodiment, the request from the user is for information about other types of topics, including places, things, and ideas.

The selection of the contact can be based on a number of factors including: the contact's relationship to the user and the entity; the contact's prior response rate to prior requests; and the contact's availability at the time of selection. The contact may simply be someone that knows a person of interest.

Recommended Method of Contact

In one embodiment, a user can invoke the collective address book system to find a recommended way to reach the person of interest based on how likely the person of interest is to see the message and how quickly that person is likely to respond to it. The collective address book system includes a routing method that takes into account communications other people have had with the person of interest, and determines or recommends contact information to use to contact that person. The system can rank the contact methods based on: how many people have that contact information in their address books; how often/recently has that contact method been used successfully (or how often that contact method has resulted in a failed contact attempt); and the relationship between the user and person of interest (for instance, if the system can classify the relationship as personal or business, the system can use that classification to determine which email address to rank as a better method of contact based on the relationship of the sender to the receiver). The ranking method can further include: (1) knowledge if a domain is good, e.g., if people tend to respond more from gmail than from work email; (2) knowledge of how the recipient's responsiveness changes based on the time an email address is used, morning, night, etc. and (3) using machine learning to compare one email address to other email addresses based on the name of the sender and relationship of the sender to the recipient, e.g., likelihood that the message will be considered a spam message by the recipient email service. Thus, the recommended contact method can change depending for example on the time of day, length of the message, type of message, and the strength of the relationship between the sender and the receiver.

In an alternative embodiment, the contact ranking method can determine the number of people who have both the user's contact information and particular contact information for the intended recipient, e.g., the intended recipient's work contact information, in their address books. The ranking method can make this determination for each different piece of contact information for the intended recipient, e.g., personal email, work email, mobile phone, work phone, and home phone. Stated differently, if the user's email is in many address books in common with the work email of the person of interest, the work email of the person of interest will be ranked higher than other person of interest contact information.

In one embodiment, the collective address book system also keeps track whenever someone responds or does not respond to a message sent to a particular email address or phone number, and also keeps track whenever an email or phone number bounces. When a person of an interest does not respond to an email from one user, the collective address book system records a claim that the person of interest might not respond to emails received from that email address, and associates the claim with a particular source, e.g., the user who sent the message. In other words, a claim is a view of an aspect of the world and is associated with a source. The person of interest might not respond to email sent by other users as well. Or the person of interest might respond to emails sent by other users but not the particular user in question. Each time the person of interest responds or does not respond, a claim is recorded. Similarly, when an email or phone number bounces, the collective address book system records a claim that the contact information is no longer valid and associates the claim with a particular source, e.g., the user who sent the message. The collective address book system then takes relevant claims into account when it makes a recommendation or determination of the best contact method. Stated differently, the ways other people have contacted a person of interest enables the collective address book system to route a user to a contact method for the person of interest that has a greater chance of success relative to other methods of record.

In one embodiment, the collective address book system ranks contact methods by a set of factors. The best contact method to reach a person may depend on who is looking. When a user is trying to reach a friend, the user likely wants the friend's personal email or phone number. When a user is trying to reach a work contact, the user likely wants the work contact's work phone or email.

Other factors that can be incorporated into the contact recommendation method include: how many other people have a particular contact method (phone/email) in their address book; the date and time of the most recent successful use of a particular contact method; and mentions of the particular contact method in messages, e.g., phone or email information in the body of a message.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers. Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In this specification, the term "database" will be used broadly to refer to any collection of data: the data does not need to be structured in any particular way, or structured at all, and it can be stored on storage devices in one or more locations.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous. As another example, when a user A asks the system for an introduction to person Z, the system can ask person B (without revealing B's identity to user A) if person B would be willing to introduce user A to person Z. If B confirms to the system that he would indeed be willing to make such an introduction, the system connects user A to person B.

What is claimed is:

1. A collective address book system comprising:
   one or more computers and one or more storage devices on which are stored instructions that are operable, when executed by the one or more computers, to cause the one or more computers to perform operations comprising:
   (a) maintaining, at a contact database, collective address book data that identifies contact information for people to which the system has access;
   (b) receiving, at a user interaction engine, a request from a particular user to contact a person of interest identified by the particular user;
   (c) accessing, at an input engine, user-specific contact data of the particular user;
   (d) determining, at the input engine, that contact information for the person of interest is not available in the user-specific contact data;
   (e) determining, at the input engine, that the collective address book data identifies contact information for the person of interest;
   (f) generating, at a proxy contact generation engine, proxy contact data for the person of interest based at least in part on (i) determining that the contact information for the person of interest is not available in the user-specific contact data and (ii) determining that the collective address book data identifies contact information for the person of interest, the proxy contact data being contact data that directs a communication to the collective address book system for further routing to the person of interest using the person of interest's true contact data and the proxy contact data being contact data that cannot be used to contact the person of interest outside of the collective address book system;
   (g) providing, by the user interaction engine, an indication of the proxy contact data to the particular user;
   (h) receiving, at the system, an indication that the particular user is sending a message to the person of interest using the proxy contact data;
   (i) in response to determining that the message has been sent using the proxy contact data, automatically delaying, at the system and with permission of the particular user, sending of the message; and
   (j) while the sending of the message is being delayed, determining whether or not to deliver the message to the person of interest by determining whether the message meets a quality metric.

2. The system of claim 1, the operations further comprising stopping the message from being sent to the person of interest when the message does not meet the quality metric.

3. The system of claim 1, the operations further comprising determining that the contact information for the person of interest is not available in public databases to which the system has access, and wherein generating the proxy data is further based in part on determining that the contact information for the person of interest is not available in public databases to which the system has access.

4. The system of claim 1, the operations further comprising receiving an indication from the particular user to use the proxy contact data to contact the person of interest.

5. The system of claim 1, the operations further comprising converting the contact data of the particular user to proxy data as part of sending a message from the particular user to the person of interest.

6. The system of claim 1, wherein the person of interest is someone other than a user of the system.

7. The system of claim 1, the operations further comprising determining a recommended method of contacting the person of interest.

8. A computer-implemented method performed by a collective address book system comprising one or more computers, the method comprising:
   (a) maintaining, at a contact database, collective address book data that identifies contact information for people to which the system has access;

(b) receiving, at a user interaction engine, a request from a particular user to contact a person of interest identified by the particular user;
(c) accessing, at an input engine, user-specific contact data of the particular user;
(d) determining, at the input engine, that contact information for the person of interest is not available in the user-specific contact data;
(e) determining, at the input engine, that the collective address book data identifies contact information for the person of interest;
(f) generating, at a proxy contact generation engine, proxy contact data for the person of interest based at least in part on (i) determining that the contact information for the person of interest is not available in the user-specific contact data and (ii) determining that the collective address book data identifies contact information for the person of interest, the proxy contact data being contact data that directs a communication to the collective address book system for further routing to the person of interest using the person of interest's true contact data, and the proxy contact data being contact data that cannot be used to contact the person of interest outside of the collective address book system;
(g) providing, by the user interaction engine, an indication of the proxy contact data to the particular user;
(h) receiving, at the system, an indication that the particular user is sending a message to the person of interest using the proxy contact data;
(i) in response to determining that the message has been sent using the proxy contact data, automatically delaying, at the system and with permission of the particular user, sending of the message; and
(j) while the sending of the message is being delayed, determining whether or not to deliver the message to the person of interest by determining whether the message meets a quality metric.

9. The computer-implemented method of claim 8, wherein the method further comprises stopping the message from being sent to the person of interest when the message does not meet the quality metric.

10. The computer-implemented method of claim 8, wherein the message is an email message.

11. The computer-implemented method of claim 8, wherein the message is a text message.

12. The computer-implemented method of claim 8, wherein the automatically delaying sending of the message comprises a delay in sending the message of less than five minutes.

13. The computer-implemented method of claim 8, wherein the proxy contact data comprises a proxy telephone number.

14. The computer-implemented method of claim 13, wherein the proxy telephone number can be reused for parties other than the particular user and the person of interest.

15. The computer-implemented method of claim 8, further comprising determining that the information for the person of interest is not available in public databases to which the system has access, and wherein generating the proxy data is further based in part on determining that the information for the person of interest is not available in public databases to which the system has access.

16. The computer-implemented method of claim 8, the method further comprising receiving an indication from the particular user to use the proxy contact data to contact the person of interest.

17. The computer-implemented method of claim 8, the method further comprising converting the contact data of the particular user to proxy data as part of sending a message from the particular user to the person of interest.

18. The computer-implemented method of claim 8, wherein the person of interest is someone other than a user of the system.

19. The computer-implemented method of claim 8, the method further comprising determining a recommended method of contacting the person of interest.

20. One or more non-transitory computer-readable storage media encoded with instructions that, when executed by one or more computers, cause the one or more computers to perform operations comprising:
(a) maintaining, in a contact database, collective address book data that identifies contact information for people to which the contact database has access;
(b) receiving, at a user interaction engine, a request from a particular user to contact a person of interest identified by the particular user;
(c) determining, at an input engine, that contact information for the person of interest is not available in the user-specific contact data;
(d) determining, at the input engine, that the collective address book data identifies contact information for the person of interest;
(e) generating, at a proxy contact generation engine, proxy contact data for the person of interest based at least in part on (i) determining that the contact information for the person of interest is not available in the user-specific contact data and (ii) determining that the collective address book data identifies contact information for the person of interest, the proxy contact data being contact data that directs a communication to the collective address book system for further routing to the person of interest using the person of interest's true contact data, and the proxy contact data being contact data that cannot be used to contact the person of interest outside of the collective address book system;
(f) providing, by the user interaction engine, the proxy contact data to the particular user;
(g) receiving, at the system, an indication that the particular user is sending a message to the person of interest using the proxy contact data;
(h) in response to determining that the message has been sent using the proxy contact data, automatically delaying, at the system and with permission of the particular user, sending of the message; and
(i) while the sending of the message is being delayed, determining whether or not to deliver the message to the person of interest by determining whether the message meets a quality metric.

21. The non-transitory computer-readable storage media of claim 20, the operations further comprising stopping the message from being sent to the person of interest when the message does not meet the quality metric.

22. The non-transitory computer-readable storage media of claim 20, the operations further comprising determining that the information for the person of interest is not available in public databases to which the contact database has access, and wherein generating the proxy data is further based in part on determining that the information for the person of interest is not available in public databases to which the system has access.

23. A system comprising:
a user device; and
one or more computers configured to interact with the user device and to perform operations comprising:
(a) maintaining, at a contact database, collective address book data that identifies contact information for people to which the system has access;
(b) receiving, at a user interaction engine, a request from a particular user to contact a person of interest identified by the particular user;
(c) accessing, at an input engine, user-specific contact data of the particular user;
(d) determining, at the input engine, that contact information for the person of interest is not available in the user-specific contact data;
(e) determining, at the input engine, that the collective address book data identifies contact information for the person of interest;
(f) generating, at a proxy contact generation engine, proxy contact data for the person of interest based at least in part on (i) determining that the contact information for the person of interest is not available in the user-specific contact data and (ii) determining that the collective address book data identifies contact information for the person of interest, the proxy contact data being contact data that directs a communication to the collective address book system for further routing to the person of interest using the person of interest's true contact data, and the proxy contact data being contact data that cannot be used to contact the person of interest outside of the collective address book system;
(g) providing, by the user interaction engine, an indication of the proxy contact data to the particular user;
(h) receiving, at the system, an indication that the particular user is sending a message to the person of interest using the proxy contact data;
(i) in response to determining that the message has been sent using the proxy contact data, automatically delaying, at the system and with permission of the particular user, sending of the message; and
(j) while the sending of the message is being delayed, determining whether or not to deliver the message to the person of interest by determining whether the message meets a quality metric.

24. The system of claim 23, wherein the one or more computers comprise a server operable to interact with the device through a data communication network, and the user device is configured to interact with the server as a client.

* * * * *